(12) United States Patent
Schneider

(10) Patent No.: US 9,720,085 B2
(45) Date of Patent: Aug. 1, 2017

(54) DRIVER ASSISTANCE METHOD FOR DETECTING OBJECTS ON THE SIDE

(75) Inventor: Marcus Schneider, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 684 days.

(21) Appl. No.: 13/574,150

(22) PCT Filed: Dec. 29, 2010

(86) PCT No.: PCT/EP2010/070846
§ 371 (c)(1),
(2), (4) Date: Oct. 4, 2012

(87) PCT Pub. No.: WO2011/091934
PCT Pub. Date: Aug. 4, 2011

(65) Prior Publication Data
US 2013/0024103 A1    Jan. 24, 2013

(30) Foreign Application Priority Data
Jan. 27, 2010  (DE) .................. 10 2010 001 258

(51) Int. Cl.
| | | |
|---|---|---|
| G06F 17/10 | (2006.01) |
| G06G 7/78 | (2006.01) |
| G08G 1/16 | (2006.01) |
| F41G 9/00 | (2006.01) |
| G01S 15/93 | (2006.01) |

(Continued)

(52) U.S. Cl.
CPC ........... *G01S 15/931* (2013.01); *B60W 40/04* (2013.01); *G08G 1/16* (2013.01); *B60W 30/12* (2013.01); *B60W 2550/10* (2013.01); *B60W 2550/308* (2013.01); *G01S 2015/933* (2013.01); *G01S 2015/935* (2013.01); *G01S 2015/938* (2013.01)

(58) Field of Classification Search
USPC ......................................... 701/300, 301, 302
See application file for complete search history.

(56) References Cited

U.S. PATENT DOCUMENTS

| | | |
|---|---|---|
| 5,684,473 A | 11/1997 | Hibino et al. |
| 5,689,264 A | 11/1997 | Ishikawa et al. |

(Continued)

FOREIGN PATENT DOCUMENTS

| | | |
|---|---|---|
| CN | 101522499 | 9/2009 |
| DE | 10257722 | 7/2004 |

(Continued)

OTHER PUBLICATIONS

International Search Report for PCT/EP2010/070846, dated Mar. 30, 2011.

*Primary Examiner* — Lail Kleinman
(74) *Attorney, Agent, or Firm* — Norton Rose Fulbright US LLP; Gerard Messina

(57) ABSTRACT

In a driver assistance method for a vehicle, to identify moving objects on the side and to avoid unnecessary collision warnings, the method includes: a) detecting an object with the aid of a first sensor; b) detecting the object with the aid of a second sensor; c) checking whether the object has left the detection area of the second sensor; and d1) discarding the distance data measured by the first sensor and the second sensor if the object has left the detection area of the second sensor; or d2) determining the position of the object from measured distance data if the object has not left the detection area of the second sensor.

10 Claims, 2 Drawing Sheets

(51) Int. Cl.
*B60W 40/04* (2006.01)
*B60W 30/12* (2006.01)

(56) References Cited

U.S. PATENT DOCUMENTS

| | | | |
|---|---|---|---|
| 7,397,351 | B1 | 7/2008 | Rubin et al. |
| 2002/0067287 | A1* | 6/2002 | Delcheccolo et al. ........ 340/901 |
| 2005/0195071 | A1 | 9/2005 | Ewerhart et al. |
| 2010/0117813 | A1* | 5/2010 | Lee .............................. 340/435 |
| 2014/0247161 | A1* | 9/2014 | Hallek .................... G01S 7/524 |
| | | | 340/932.2 |

FOREIGN PATENT DOCUMENTS

| | | |
|---|---|---|
| DE | 10 2004 011281 | 9/2005 |
| DE | 10 2006 047634 | 4/2008 |
| JP | 2008-262414 | 10/2008 |
| WO | WO 2007/036395 | 4/2007 |

* cited by examiner

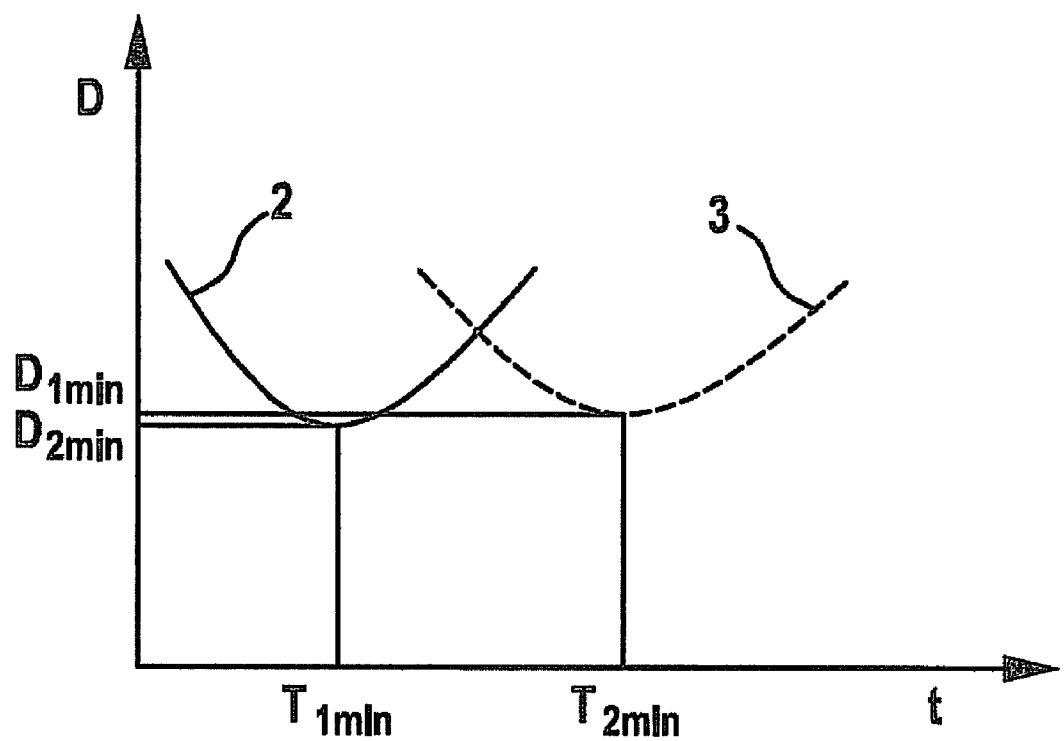

DRIVER ASSISTANCE METHOD FOR DETECTING OBJECTS ON THE SIDE

BACKGROUND OF THE INVENTION

1. Field of the Invention

The present invention relates to a driver assistance method for a vehicle, in particular a motor vehicle.

2. Description of the Related Art

Driver assistance methods and systems for vehicles analyze the vehicle surroundings or driving situation and actively or passively support the vehicle driver in driving the vehicle. Driver assistance methods and/or systems of this type are described, for example, in published international patent application document WO 2007/036395 A1, U.S. Pat. No. 5,689,264, published U.S. patent application document US 2005/0195071 A1 and U.S. Pat. No. 7,397,351 B1.

In maneuvers involving turning a vehicle around an object, for example a wall, another vehicle or a post, in a narrow space, for example in a parking garage, the vehicle may graze the object. The vehicle usually grazes the object with the rear vehicle area, for example the rear fender. The reason for this is that the curve radius of the steered front wheels is larger than the curve radius of the rear wheels.

It would therefore be helpful if the side area of the vehicle could be monitored and a collision could be prevented by outputting a warning to the driver of the vehicle.

However, moving objects such as oncoming traffic, passing traffic or people are problematic. While these objects may be detected as relevant objects, they may no longer be located at the detected position by the time the turning maneuver is carried out, so that an imminent collision may be groundlessly assumed.

BRIEF SUMMARY OF THE INVENTION

An object of the present invention is a driver assistance method for a vehicle, in particular a motor vehicle, having a sensor system which includes at least one first distance-measuring sensor and one second distance-measuring sensor which detect a detection area on the side of the vehicle for detecting objects on the side, the first and second sensors being situated one after the other on one side of the vehicle in the driving direction, one sensor being situated in the front area and one sensor being situated in the rear area of the vehicle, including the method steps:
a) detecting a (side) object with the aid of the first sensor;
b) detecting the (same) (side) object with the aid of the second sensor;
c) checking whether the (same) object has left the detection area of the second sensor;
d1) discarding the distance data measured by the first and second sensors if the (same) object has left the detection area of the second sensor; or
d2) determining the position of the (same) object from measured distance data if the (same) object has not left the detection area of the second sensor.

Due to the method according to the present invention, unnecessary collision warnings caused by oncoming traffic or passing traffic may be prevented. The driver is not irritated thereby, which may help avoid danger on high-traffic roads, for example when executing a turning maneuver.

Whether a sensor is referred to as a first sensor or a second sensor within the scope of the method according to the present invention depends on whether the object approaches the front area or the rear area of the vehicle first. If oncoming traffic is detected, for example, the front sensor may be the first sensor and the rear sensor may be the second sensor. In the case of passing traffic and/or while backing up the vehicle, however, the rear sensor may be the first sensor and the front sensor may be the second sensor.

Within the scope of one specific embodiment of the present invention, the method includes the following method step after method step(s) a) and/or b):
c0) storing the distance data measured by the first sensor and/or the second sensor,
the stored distance data either being deleted in method step d1) or at least partially used in method step d2) to determine the position of the object.

Within the scope of another specific embodiment of the method, the position of the object is determined in method step d2) from distance data which were measured by one of the sensors, in particular the first sensor, while the vehicle was passing the object, and/or which were measured by the first and second sensors while the vehicle was stopped or was passing the object.

Within the scope of another specific embodiment of the method, the position of the object is determined in method step d2) on the basis of the curve over time of the distance values measured by the first and/or second sensor(s), in particular by the first sensor.

Within the scope of another specific embodiment of the method, the relative speed of the object toward the vehicle is furthermore determined in method step d2) from the ratio between the distance between the first and second sensors to the time difference between the point in time at which a minimum distance to the first sensor was detected and the point in time at which a minimum distance to the second sensor was detected.

Within the scope of another specific embodiment of the method, the method includes the following method step after method step d2):
e) storing the position of the object determined in method step d2) and/or the relative speed of the object determined in method step d2).

The position of the object determined in method step d2) may not be stored or may be deleted in method step e) if the relative speed of the object toward the vehicle determined in method step d2) is greater than the speed of the vehicle itself and no collision is to be expected. However, the position of the object determined in method step d2) may be stored or may not be deleted in method step e) if the relative speed of the object toward the vehicle determined in method step d2) is greater than the speed of the vehicle itself and a collision is to be expected. In this way, the relative speed of the object toward the vehicle may be additionally taken into account in method step f), which is explained below. The speed of the vehicle itself may be estimated, if necessary, on the basis of the determined relative speed of the object toward the vehicle. However, a speed supplied and/or measured by equipment of the vehicle is preferably used as the speed of the vehicle.

Within the scope of another specific embodiment of the method, the method includes the following method step after method step d2) or e):
f) calculating the distance of the vehicle to the object from the position of the object stored in method step e) and/or the relative speed of the object toward the vehicle and the outer contour of the vehicle and the current position of the vehicle and/or the current trajectory of the vehicle.

Within the scope of another specific embodiment of the method, the method includes the following method step after method step f):

g) outputting a collision warning to the driver and/or outputting a driving instruction to the driver for collision avoidance and/or automatically changing and/or interrupting the movement of the vehicle for collision avoidance if the distance calculated in method step f) drops below a minimum value ($d_{min}$).

The collision warning or driving instruction may be output, for example, acoustically and/or visually and/or haptically. For example, a speaker may be used to output a sound, in particular a beep, whose volume increases as a function of the distance and/or whose level increases as a function of the distance and/or whose repetition interval shortens as a function of the distance.

An automatic change or interruption of the vehicle movement may be carried out, for example, by automatically braking and/or automatically steering the vehicle to avoid a collision. "Automatic" may be understood to mean that the change or interruption of the vehicle movement is initiated by a control unit of the vehicle and not by the driver of the vehicle.

It is possible to carry out the method using a sensor system which has sensors on only one side. In a vehicle for right hand traffic, the sensors are preferably situated on the left side of the vehicle, and in a vehicle for left hand traffic, they are situated on the right side of the vehicle. However, since moving objects on the right side of the vehicle may also be relevant, for example when turning right, merging back into the lane and parking in right hand traffic, the sensor system preferably has at least one first sensor and one second sensor on both sides of the vehicle.

Within the scope of another specific embodiment of the method, the sensor system therefore has at least one further first distance measuring sensor and one further second distance-measuring sensor which detect a detection area on the side of the vehicle for detecting objects on the side, the further first sensor and the further second sensor being situated in a mirror-image configuration in relation to the first and second sensors on the other side of the vehicle.

Within the scope of the present invention, the "front area of the vehicle" and the "rear area of the vehicle" may be understood to mean, in particular, the complete area in front of and behind the center of the vehicle, in relation to the forward driving direction of the vehicle. For example, the sensors may be situated at the height of the front and rear vehicle doors and/or the front and rear vehicle wheels.

However, one of the sensors is preferably situated within an area of >0% to ≤25%, for example ≥1% to ≤15%, of the entire vehicle length, measured from the frontmost point of the vehicle in the forward driving direction, and another sensor is situated in an area of ≥75% to <100%, for example ≥85% to ≤99%, of the entire vehicle length, measured from the foremost point of the vehicle in the forward driving direction. For example, the sensors may be situated in lateral areas of a front bumper and in lateral areas of a rear bumper.

The sensors may be, for example, ultrasonic sensors, infrared sensors, radar sensors, optical sensors or electrical field sensors.

Within the scope of another specific embodiment of the method, however, the sensors are ultrasonic sensors.

The driver assistance method may be, for example, a collision warning method, a collision avoidance method, a vehicle control method, an automatic steering method and/or an automatic braking method, in particular a turning assistance method, a parking assistance method, for example a parking and/or deparking assistance method, a passing assistance method and/or a blind spot monitoring method.

For example, the driver assistance method may be used in a collision warning system, a collision avoidance system, a vehicle control system, an automatic steering system and/or an automatic braking system, in particular a turning assistance system, a parking assistance system, in particular a parking and/or deparking assistance system, a passing assistance system and/or a blind spot monitoring system.

BRIEF DESCRIPTION OF THE DRAWINGS

FIG. 3 shows a graph for schematically illustrating the curve over time of the distance values which were measured by two sensors of the vehicle from FIG. 1 or FIG. 2.

DETAILED DESCRIPTION OF THE INVENTION

Figure 1:
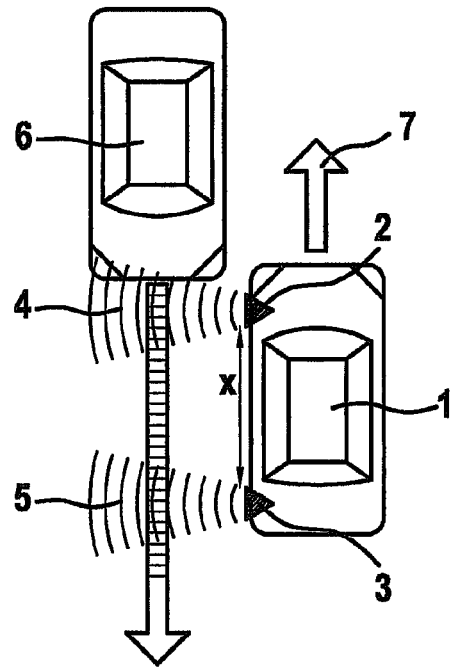
FIG. 1 shows a schematic view of a vehicle which has two sensors situated on one side of the vehicle to which another vehicle is oncoming.

FIG. 1 shows a vehicle 1, which includes a sensor system 2, 3 having a first distance-measuring sensor 2 and a second distance-measuring sensor 3 which detect a detection area 4, 5 on the side of vehicle 1 for detecting objects on the side 6. First sensor 2 and second sensor 3 are situated one after the other on one side of vehicle 1 in driving direction 7, one sensor 2 being situated in the front area and one sensor 3 being situated in the rear area of vehicle 1. FIG. 1 shows that vehicle 1 is being approached by another vehicle 6 as oncoming traffic. Front sensor 2 therefore detects other vehicle 6 first and is therefore referred to as first sensor 2. Rear sensor 3 detects other vehicle 6 only after front, first sensor 2 and is therefore referred to as the second sensor. FIG. 1 furthermore shows that sensors 2, 3 are situated at the height of the vehicle wheels.

If a vehicle 1 of this type comes too close to an object 5 when making a turn, the position thereof may be detected by lateral sensors 2, 3 and the driver may be warned. For this purpose, only one lateral sensor 2 is required when vehicle 1 passes object 6. The position of object 6 may subsequently be correlated with the vehicle position and vehicle trajectory currently being driven and stored by a control unit in a "digital map of the surroundings." During a subsequent movement of vehicle 1, the distance of the vehicle to object 6 may be calculated continuously. If the calculated distance is less than a minimum distance ($d_{min}$), a collision warning and/or a collision-avoiding driving instruction may be output to the driver and/or the vehicle movement may be automatically changed and/or interrupted for collision avoidance. This has the advantage that, once the object has been detected and stored in the map of the surroundings, it does not have to be detected again, since its position may be subsequently calculated without any additional measured data.

In the event of oncoming traffic or passing traffic, the moving object is advantageously first detected by first sensor 2 and shortly thereafter by second sensor 3 and, once it is detected, first leaves detection area 4 of first sensor 2 and then detection area 5 of second sensor 3. Based on this behavior, oncoming traffic and passing traffic may be detected as such and the position thereof may, if necessary, not be transferred to the electronic map of the surroundings or it may be deleted from the electronic map of the surroundings. In addition, the speed of the oncoming traffic or passing traffic may be estimated or even calculated from the time interval between the detection or non-detection of object 6 by first sensor 2 and second sensor 3.

According to the present invention, therefore, a check is made of whether object 6 has left detection area 5 of second sensor 3. If object 6 has left detection area 5 of second sensor 3, the distance data measured by first sensor 2 and second sensor 3 are discarded. This makes it possible to advantageously avoid an unnecessary collision warning. If object 6 has not left detection area 5 of second sensor 3, however, the position of object 6 is determined from the measured distance data and made available, for example in an electronic map of the surroundings, for later further processing, in particular for calculating the distance of vehicle 1 to object 6 and for outputting a collision warning and/or a collision-avoiding driving instruction to the driver and/or for automatically changing and/or interrupting the vehicle movement for collision avoidance.

Figure 2:
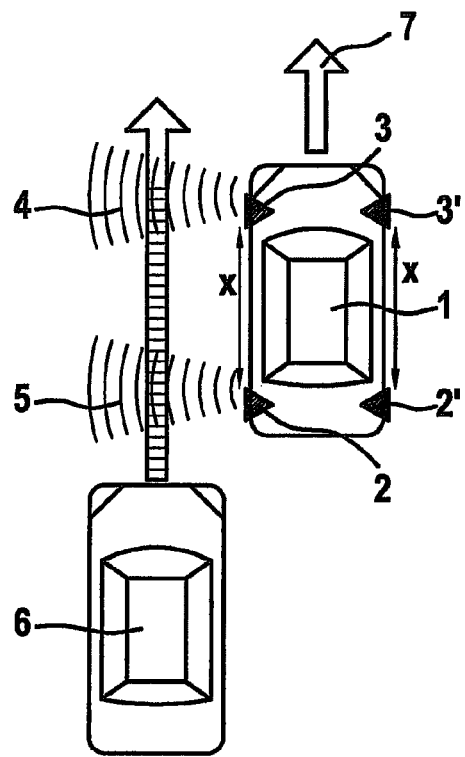
FIG. 2 shows a schematic view of a vehicle which has two sensors situated on one side of the vehicle and two sensors situated in a mirror-image configuration in relation thereto on the other side of the vehicle and which is being passed by another vehicle.

FIG. 2 shows a vehicle 1, whose sensor system 2, 3, 2', 3' includes not only first sensor 2 and second sensor 3 on the one side of the vehicle but also, on the other side of the vehicle, another first distance-measuring sensor 2' and another second distance-measuring sensor 3' which detect a detection area 4', 5' on the side of vehicle 1 for detecting objects on the side 6. Further first sensor 2' and further second sensor 3' are situated in a mirror-image configuration in relation to first sensor 2 and second sensor 3. FIG. 2 furthermore shows that vehicle 1 is being passed by another vehicle 6. In this case, the rear sensor is therefore referred to as first sensor 2 and the front sensor as the second sensor.

FIG. 3 illustrates the schematic curve over time of the distance values which were measured by first sensor 2 and second sensor 3 of vehicle 1 from FIG. 1 and FIG. 2. FIG. 3 shows that, at a constant speed of the two vehicles 1, 6, the distance values have a largely hyperbolic curve over time. The position of other vehicle 6 may be advantageously determined on the basis of the curve over time of the distance values of one of the two sensors 2, 3. The relative speed of other vehicle 6 toward vehicle 1 may also be advantageously determined from the curves over time of the two sensors 2, 3 combined. In particular, a determination, in particular a calculation, may be made from the ratio between distance x between first sensor 2 and second sensor 3 to the time difference between point in time $T_{1min}$ at which a minimum distance $D_{1min}$ to first sensor 2 was detected, and point in time $T_{2min}$, at which a minimum distance $D_{2min}$ to second sensor 3 was detected.

What is claimed is:

1. A driver assistance method for a vehicle having a sensory system which includes at least one first distance-measuring sensor situated in the front area of the vehicle on one lateral side of the vehicle configured to detect an object in a first detection area on the one side of the vehicle and one second distance-measuring sensor located in the rear of the vehicle on the one lateral side to detect the object in a second detection area on the one side of the vehicle, the method comprising:
    (a) detecting the object on the one side with the aid of the first sensor, wherein the detection of the object includes measuring a distance to the object;
    (b) detecting the object on the one side with the aid of the second sensor, wherein the detection of the object includes measuring a distance to the object;
    (c) checking whether the object has left the detection area of the second sensor; and
    one of: (d1) discarding distance data measured by the first sensor and the second sensor if the object has left the detection area of the second sensor; or (d2) determining the position of the object from the distance data measured by the first sensor and the second sensor if the object has not left the detection area of the second sensor.

2. The driver assistance method as recited in claim 1, further comprising the following step after at least one of the step (a) and step (b):
    (c0) storing at least one of the distance data measured by the first sensor and the distance data measured by the second sensor, wherein the stored distance data are one of deleted in step (d1) or at least partially used in step (d2) to determine the position of the object.

3. The driver assistance method as recited in claim 1, wherein the position of the object is determined in step (d2) from the distance data which are measured by at least one of the first and second sensors while the vehicle passes the object.

4. The driver assistance method as recited in claim 1, wherein the position of the object is determined in method step (d2) on the basis of a time curve of the distance data which are measured by at least one of the first and second sensors.

5. The driver assistance method as recited in claim 4, wherein a speed of the object is determined in step (d2) based on a ratio of (i) a distance between the first sensor and the second sensor to (ii) a time difference between a point in time at which a minimum distance to the first sensor is detected and a point in time at which a minimum distance to the second sensor is detected.

6. The driver assistance method as recited in claim 5, further comprising after step (d2):
    (e) storing at least one of the position of the object and the speed of the object determined in step (d2).

7. The driver assistance method as recited in claim 6, further comprising after at least one of step (d2) and step (e):
    (f) calculating a distance of the vehicle to the object based on (i) at least one of the position of the object stored in step (e) and a relative speed of the object toward the vehicle, (ii) the outer contour of the vehicle, and (iii) at least one of a current position of the vehicle and a current trajectory of the vehicle.

8. The driver assistance method as recited in claim 7, further comprising after step (f):
    (g) if the distance calculated in step (f) drops below a predetermined minimum value, at least one of (i) outputting a collision warning to the driver, (ii) outputting a driving instruction to the driver for collision avoidance, and (iii) at least one of automatically changing and interrupting vehicle movement for collision avoidance.

9. The driver assistance method as recited in claim 4, wherein the sensor system further includes: (i) a third distance-measuring sensor situated in the front area of the vehicle on a second lateral side of the vehicle opposite from the first sensor, the third sensor being configured to detect an object in a third detection area on the second lateral side of the vehicle, and (ii) a fourth distance-measuring sensor situated in the rear area of the vehicle on the second lateral side of the vehicle opposite from the second sensor, the fourth sensor being configured to detect an object in a fourth detection area on the second lateral side of the vehicle.

10. The driver assistance method as recited in claim 9, wherein the first, second, third and fourth sensors are ultrasonic sensors.

* * * * *